(12) United States Patent
Cho et al.

(10) Patent No.: US 9,681,284 B2
(45) Date of Patent: Jun. 13, 2017

(54) METHOD AND APPARATUS FOR MANAGING INFORMATION FOR DIRECT COMMUNICATION BETWEEN DEVICES

(71) Applicant: Electronics and Telecommunications Research Institute, Daejeon (KR)

(72) Inventors: Eun Seon Cho, Daejeon (KR); Hyung-sub Kim, Daejeon (KR); Chan Yong Lee, Daejeon (KR); Yeon Seung Shin, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 136 days.

(21) Appl. No.: 14/643,869

(22) Filed: Mar. 10, 2015

(65) Prior Publication Data
US 2015/0289126 A1  Oct. 8, 2015

(30) Foreign Application Priority Data

Apr. 3, 2014  (KR) .................. 10-2014-0040210

(51) Int. Cl.
*H04W 8/00* (2009.01)
*H04W 72/08* (2009.01)
*H04W 72/04* (2009.01)
*H04W 84/12* (2009.01)
*H04W 8/18* (2009.01)

(52) U.S. Cl.
CPC ......... *H04W 8/005* (2013.01); *H04W 72/085* (2013.01); *H04W 8/18* (2013.01); *H04W 84/12* (2013.01)

(58) Field of Classification Search
CPC . H04W 8/005; H04W 72/048; H04W 72/085; H04W 84/12; H04W 8/18; H04W 8/00; H04W 72/04; H04W 72/08
See application file for complete search history.

(56) References Cited

U.S. PATENT DOCUMENTS

| | | | |
|---|---|---|---|
| 2013/0322388 A1 | 12/2013 | Ahn et al. | |
| 2014/0003262 A1* | 1/2014 | He | H04W 28/08 370/252 |
| 2014/0194115 A1* | 7/2014 | Yang | H04W 4/008 455/426.1 |
| 2015/0289126 A1* | 10/2015 | Cho | H04W 8/005 370/254 |

FOREIGN PATENT DOCUMENTS

| KR | 1020120074255 A | 7/2012 |
|---|---|---|
| KR | 1020130063650 A | 6/2013 |
| KR | 1020130065253 A | 6/2013 |

* cited by examiner

*Primary Examiner* — Noel Beharry
*Assistant Examiner* — Ruihua Zhang
(74) *Attorney, Agent, or Firm* — William Park & Associates Ltd.

(57) ABSTRACT

A method in which a base station manages information for D2D communication, which is direct communication between terminals, is provided. The base station receives a first message that requests a configuration of a first open discovery service that searches for a first terminal and at least one terminal to perform D2D communication. The base station determines whether a resource to allocate to the first terminal exists. The base station stores first information for providing the first open discovery service based on the determination result.

17 Claims, 12 Drawing Sheets

FIG. 1

| Index | Discovery Number (101) | Local_RNTI (102) | DiscResourceIndex (103) | State_flag (104) |
|---|---|---|---|---|
| 1 | | | | |
| 2 | | | | |
| ... | | | | |

Open_DiscInfoTBL(100)

FIG. 2

| Index | Discovery Number (111) | Local RNTI (112) | Peer RNTI (113) | DiscResourceIndex (114) | State_flag (115) |
|---|---|---|---|---|---|
| | | | Restricted_DiscInfoTBL(110) | | |
| 1 | | | | | |
| 2 | | | | | |
| ... | | | | | |

FIG. 3

| Index | D2D_LinkInfoTBL(120) | | | | | |
|---|---|---|---|---|---|---|
| | D2D Link Identity (121) | Local RNTI (122) | Peer RNTI (123) | measId (124) | measTriggerType (125) | State_flag (126) |
| 1 | | | | | | |
| 2 | | | | | | |
| ... | | | | | | |

METHOD AND APPARATUS FOR MANAGING INFORMATION FOR DIRECT COMMUNICATION BETWEEN DEVICES

CROSS-REFERENCE TO RELATED APPLICATION

This application claims priority to and the benefit of Korean Patent Application No. 10-2014-0040210 filed in the Korean Intellectual Property Office on Apr. 3, 2014, the entire contents of which are incorporated herein by reference.

BACKGROUND OF THE INVENTION (a) Field of the Invention

The present invention relates to a method in which a base station manages Device to Device (D2D) communication related information necessary for direct communication between terminals.

(b) Description of the Related Art

Device to Device (D2D) communication, which is direct communication between terminals, is a communication method in which two adjacent terminals perform direct data transmission and reception without passing through a base station. That is, D2D communication is used to perform communication while two terminals become a source and a destination, respectively, of data.

Direct communication between terminals may use an unlicensed band of a wireless local area network (LAN) or Bluetooth such as IEEE 802.11. However, it is difficult for direct communication between terminals to use such an unlicensed band to provide a planned and controlled service. Particularly, performance of direct communication between terminals may be rapidly reduced by interference.

Direct communication between terminals that is operated or provided in an environment in which interference between systems is controlled or a license band can support a Quality of Service (QoS), enhance frequency use efficiency through frequency reuse, and increase a communication available distance.

A service using direct communication between terminals may include a discovery service for searching for another terminal such as a missing child alert and criminal proximity warning, and a D2D communication service for data communication such as audiovisual communication, personal broadcasting, and file transmission. The discovery service may include an open discovery service that can receive advertisement of unspecified terminals such as an advertisement service and a restricted discovery service for searching for a previously related specific other party.

The discovery service and the D2D communication service include a configuration procedure of a base station to be performed for direct communication between two D2D terminals, and a release procedure of a base station to be performed when communication is terminated. A method of managing D2D information by a base station such as addition or deletion of D2D related information according to configuration and release procedures of such several D2D services is requested.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and apparatus for managing D2D-related information within a base station system necessary for direct communication between terminals.

An exemplary embodiment of the present invention provides a method in which a base station manages information for Device to Device (D2D) communication, which is direct communication between terminals. The method includes: receiving a first message that requests a configuration of a first open discovery service that searches for at least one terminal to perform D2D communication with a first terminal; determining whether a resource to allocate to the first terminal exists; and storing first information for providing the first open discovery service based on the determination result.

The method may further include: transmitting a second message that requests measurement of a channel for the first open discovery service to the first terminal; allocating at least one first resource to the first terminal based on a channel measurement result that is received from the first terminal; and including information of the first resource in the first information.

The receiving of a first message may include receiving the first message from a Mobility Management Entity (MME).

The determining of whether a resource to allocate to the first terminal exists may include determining, when a resource is not allocated to the first terminal, whether a resource to allocate to the first terminal exists.

The first information may include a discovery number that is included in the first message, Radio Network Temporary Identifier (RNTI) information that is allocated to the first terminal, and information of the first resource.

The storing of first information may include including, when a resource is already allocated to the first terminal, information of the already allocated resource in the first information and storing the first information.

The method may further include: transmitting a primitive including information of the first resource to a Media Access Control (MAC) layer; and transmitting a third message including information of the first resource to the first terminal.

The method may further include: receiving a third message that requests release of the first open discovery service from the MME; transmitting a fourth message including information for release of the first open discovery service to the first terminal; and deleting the first information, when a response message to the fourth message is received from the first terminal.

The method may further include: determining whether another open discovery service for the first terminal other than the first open discovery service exists; and releasing the first resource based on whether another open discovery service for the first terminal exists.

Another embodiment of the present invention provides a method in which a base station manages information for Device to Device (D2D) communication. The method includes: receiving a first message that requests a configuration of a first restricted discovery service that searches for a second terminal to perform D2D communication with a first terminal from a Mobility Management Entity (MME); determining whether a resource to allocate to the first terminal and the second terminal exists; and storing first information for providing the first restricted discovery service based on the determination result.

The method may further include: transmitting a second message that requests measurement of a channel for the first restricted discovery service to at least one of the first terminal and the second terminal based on the determination result; allocating at least one resource to at least one of the first terminal and the second terminal based on a channel measurement result that is received from at least one of the first terminal and the second terminal; and including information of the allocated resource in the first information.

The first information may include: a discovery number that is included in the first message; RNTI information that is allocated to the first terminal; RNTI information that is allocated to the second terminal; and information of the allocated resource.

The storing of first information may include storing the first information, when the determination result corresponds to any one of a first case in which the number of allocatable resources is at least two, a second case in which the number of allocatable resources is one and in which a resource is already allocated to any one of the first terminal and the second terminal, and a third case in which a resource is already allocated to the first terminal and the second terminal.

The transmitting of a second message may include: transmitting, when the determination result corresponds to the first case, the second message to the first terminal and the second terminal; and transmitting, when the determination result corresponds to the second case, the second message to the first terminal in which a resource is not allocated among the first terminal and the second terminal.

The allocating of at least one resource may include: allocating, when the determination result corresponds to the first case, at least one resource to each of the first terminal and the second terminal based on a channel measurement result that is received from the first terminal and the second terminal; and allocating, when the determination result corresponds to the second case, at least one resource to the first terminal based on a channel measurement result that is received from the first terminal.

The method may further include: receiving a third message that requests release of the first restricted discovery service from the MME; transmitting a primitive including information about release of the first restricted discovery service to a MAC layer; transmitting a fourth message including information for release of the first restricted discovery service to the first terminal and the second terminal; and deleting the first information, when a response message to the fourth message is received from the first terminal and the second terminal.

Yet another embodiment of the present invention provides a method in which a base station manages information for Device to Device (D2D) communication. The method includes: receiving a first message that requests proximity measurement between a first terminal and a second terminal from a Mobility Management Entity (MME) for a first D2D communication service for data communication between the first terminal and the second terminal; allocating the same first link identifier to the first terminal and the second terminal; storing information of the first terminal, information of the second terminal, and the first link identifier; and transmitting a second message that requests proximity measurement to the first terminal and the second terminal.

The method may further include: determining whether a link configuration between the first terminal and the second terminal is available based on a proximity measurement result that is received from the first terminal and the second terminal; transmitting a third message including the determination result to the MME; receiving a fourth message that requests a configuration of a bearer from the MME, having received the third message; transmitting information of the first terminal, information of the second terminal, the first link identifier, and information about the bearer to a MAC layer and a Physical (PHY) layer; and transmitting the information about the bearer to the first terminal and the second terminal.

The transmitting of a third message may include: transmitting, when a link configuration between the first terminal and the second terminal is available, the third message representing that a link configuration is available to the MME; and transmitting, when a link configuration between the first terminal and the second terminal is unavailable, the third message representing that a link configuration is unavailable to the MME, releasing the first link identifier, and deleting information of the first terminal, information of the second terminal, and the first link identifier.

The storing of information may include adding the information of the first terminal, the information of the second terminal, and the first link identifier to a first table.

The first table may include: a first field that stores the first link identifier; a second field that stores RNTI information, which is information of the first terminal and that is allocated to the first terminal; a third field that stores RNTI information, which is information of the second terminal and that is allocated to the second terminal; a fourth field that stores an identifier of proximity measurement that is requested for the first D2D communication service; and a fifth field that stores a type of proximity measurement that is requested for the first D2D communication service.

The method may further include: receiving a fifth message that requests release of the first D2D communication service from the MME; transmitting a sixth message including information for release of the first D2D communication service to the first terminal and the second terminal; deleting, when a response message to the sixth message is received from the first terminal and the second terminal, information related to the first D2D communication service from the first table; and releasing the first link identifier.

BRIEF DESCRIPTION OF THE DRAWINGS

FIG. 1 is a diagram illustrating a first table that a base station manages for an open discovery service according to an exemplary embodiment of the present invention.

FIG. 2 is a diagram illustrating a second table that a base station manages for a restricted discovery service according to an exemplary embodiment of the present invention.

FIG. 3 is a diagram illustrating a third table that a base station manages for a D2D communication service according to an exemplary embodiment of the present invention.

DETAILED DESCRIPTION OF THE EMBODIMENTS

Figure 4:
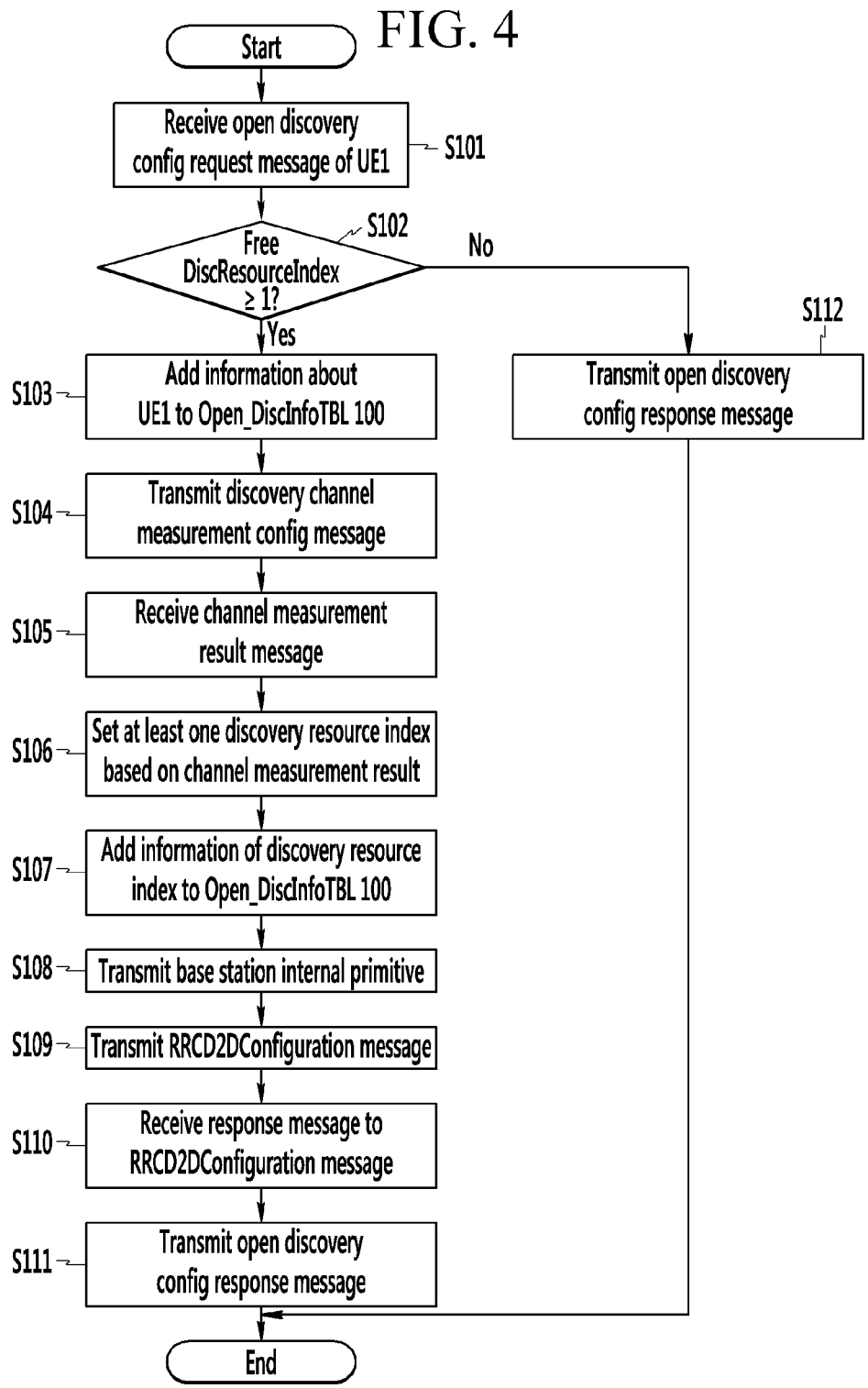
FIG. 4 is a flowchart illustrating a process in which a base station manages a first table when an open discovery service is set according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the entire specification, a terminal may indicate a mobile terminal (MT), a mobile station (MS), an advanced mobile station (AMS), a high reliability mobile station (HR-MS), a subscriber station (SS), a portable subscriber station (PSS), an access terminal (AT), and user equipment (UE), and may include an entire function or a partial function of the MT, the MS, the AMS, the HR-MS, the SS, the PSS, the AT, and the UE.

Further, a base station (BS) may indicate an advanced base station (ABS), a high reliability base station (HR-BS), a node B (nodeB), an evolved node B (eNodeB), an access point (AP), a radio access station (RAS), a base transceiver station (BTS), a mobile multihop relay (MMR)-BS, a relay station (RS) that performs a function of the BS, and an HR-RS that performs a function of the BS, and may include an entire function or a partial function of the ABS, the nodeB, the eNodeB, the AP, the RAS, the BTS, the MMR-BS, the RS, and the HR-RS.

An exemplary embodiment of the present invention may relate to direct communication between terminals in a licensed band. Specifically, an exemplary embodiment of the present invention may relate to direct communication between cellular communication-based terminals. In this case, for direct communication between terminals, a base station allocates a resource to a terminal, and here, the resource may be a cellular uplink channel.

A D2D system for a D2D service may include a D2D terminal having a D2D service function, a base station, a Mobility Management Entity (MME), a Serving-Gateway (Serving-GW), a Packet Data Network-Gateway (PDN-GW), and a D2D server. A discovery service or a D2D communication service is started when a terminal requests a service from a D2D server. Thereafter, an entire configuration necessary for a D2D service (e.g., a discovery service, a D2D communication service) is performed through a procedure that transmits and receives a signal between the D2D server, the base station, and a network component.

Hereinafter, an exemplary embodiment of the present invention will be described in detail with reference to FIGS. 1 to 12.

FIG. 1 is a diagram illustrating a first table (Open_DiscInfoTBL) 100 that a base station manages for an open discovery service according to an exemplary embodiment of the present invention. Specifically, FIG. 1 illustrates an Open_DiscInfoTBL 100 that stores information related to an open discovery service in a D2D information table that a base station manages. The base station generates or deletes contents of the Open_DiscInfoTBL 100 according to a procedure of an open discovery service.

The Open_DiscInfoTBL 100 includes a Discovery Number 101, a Local RNTI 102, a DiscResourceIndex 103, and a State_flag 104.

The Discovery Number 101 represents a number that is included in a message that is received from the MME. The discovery number may be an intrinsic number in a D2D system. The Local RNTI 102 represents a Radio Network Temporary Identifier (RNTI) that is allocated to the terminal. The DiscResourceIndex 103 represents an index of a discovery channel that is used for transmitting a discovery service. The terminal may receive allocation of at least one discovery channel index (or a discovery resource index) according to an application. The base station may allocate at least one discovery channel index and notify a terminal of the at least one discovery channel index. The State_flag 104 represents state information for controlling an abnormal situation that may occur in a procedure of an open discovery service.

FIG. 2 is a diagram illustrating a second table (Restricted_DiscInfoTBL) 110 that a base station manages for a restricted discovery service according to an exemplary embodiment of the present invention. FIG. 2 illustrates a Restricted_DiscInfoTBL 110 that stores information related to a restricted discovery service among D2D information table that a base station manages. The base station generates or deletes contents of the Restricted_DiscInfoTBL 110 according to a procedure of a restricted discovery service.

The Restricted_DiscInfoTBL 110 may include a Discovery Number 111, a Local RNTI 112, a Peer RNTI 113, a DiscResourceIndex 114, and a State_flag 115.

The Discovery Number 111 represents a number that is included in a message that is received from the MME, and the discovery number may be an intrinsic numeral in a D2D system. The Local RNTI 112 represents an RNTI that is allocated to the terminal. The Peer RNTI 113 represents an RNTI that is allocated to another terminal that performs a discovery service. The DiscResourceIndex 114 represents an index of a discovery channel that is used for transmitting a discovery service. In a restricted discovery service, a discovery channel index (or a discovery resource index) may be allocated to each terminal, and the base station may allocate a discovery channel index and notify the terminal of the discovery channel index. For example, when a restricted discovery service is set for the UE1 and the UE2, each of a discovery resource index that is allocated to the UE1 for transmission and a discovery resource index that is allocated to the UE2 for transmission may be stored at different rows of the DiscResourceIndex 114 of the Restricted_DiscInfoTBL 110. The State_flag 115 represents state information for controlling an abnormal situation that may occur in a procedure of a restricted discovery service.

FIG. 3 is a diagram illustrating a third table (D2D_LinkInfoTBL) 120 that a base station manages for a D2D communication service according to an exemplary embodiment of the present invention. Specifically, FIG. 3 illustrates a D2D_LinkInfoTBL 120 that stores information (e.g., link information about a pair that communicates) related to a D2D communication service in a D2D information table that the base station manages. The base station generates or deletes contents of the D2D_LinkInfoTBL 120 according to a procedure of a D2D communication service.

The D2D_LinkInfoTBL 120 may include a D2D Link Identity 121, a Local RNTI 122, a Peer RNTI 123, a measId 124, a measTriggerType 125, and a State_flag 126.

The D2D Link Identity 121 represents a link identifier that is given to a pair that performs D2D communication. The link identifier may be a value equal to or greater than 1, and the same link identifier may be allocated to two terminals. The base station may allocate a link identifier and notify the terminal of the link identifier. The Local RNTI 112 represents an RNTI that is allocated to the terminal. The Peer RNTI 123 represents an RNTI that is allocated to another terminal that performs a D2D communication service. The measId 124 represents an identifier of proximity measurement that is requested to a terminal for a D2D communication service. Specifically, in a D2D communication service, because a plurality of links may be set to one terminal, in order to determine a plurality of link states, a plurality of proximity measurements may be performed. The measurement identifier may be an identifier using for distinguishing each link in a proximity measurement process. The measTriggerType 125 represents a type of proximity measurement. Specifically, a measurement type is a type of presently performing proximity measurement, and may be any one of an event measurement type and a cyclic measurement type. The State_flag 126 represents state information for controlling an abnormal situation that may occur in a procedure of a D2D communication service.

FIG. 4 is a flowchart illustrating a process in which a base station manages an Open_DiscInfoTBL 100 when an open discovery service is set according to an exemplary embodiment of the present invention.

The base station receives a request for a configuration of an open discovery service for a UE1 from an MME. Specifically, the base station may receive an open discovery config request message of the UE1 from the MME (S101). The base station, having received the open discovery config request message, determines whether a discovery resource index is already allocated to the UE1. If a discovery resource index is already allocated to the UE1, the base station may add information (e.g., discovery number, local RNTI, and discovery resource index that is already allocated to the UE1) related to an open discovery service for the UE1 to the Open_DiscInfoTBL 100. The base station may insert a success result to an open discovery configuration response message and transmit the open discovery configuration response message to the MME.

If a discovery resource index is not allocated to the UE1, the base station determines whether an allocatable resource exists in resources (hereinafter, a "discovery resource") for a discovery service (S102). Specifically, the base station may determine an allocatable discovery resource index.

If the number of allocatable discovery resource indexes is smaller than 1, the base station inserts a fail result representing that a discovery resource cannot be allocated into an open discovery configuration response message and transmits the open discovery configuration response message to the MME (S112).

If the number of allocatable discovery resource indexes is equal to or greater than 1, the base station adds information about the UE1 to the Open_DiscInfoTBL 100 (S103). Specifically, the base station may add information (e.g., discovery number, local RNTI) related to an open discovery service for the UE1 to the Open_DiscInfoTBL 100.

In order to measure a discovery channel, the base station transmits a discovery channel measurement configuration message to the UE1 (S104).

When the base station receives a channel measurement result message from the UE1 (S105), the base station sets (allocates) at least one discovery resource index based on the channel measurement result (S106).

The base station adds information of the discovery resource index that is set (allocated) at step S106 to the Open_DiscInfoTBL 100 (S107).

In order to notify a Media Access Control (MAC) layer of configuration information (e.g., information of a discovery resource index that is allocated at step S106), the base station transmits a base station internal primitive (S108).

In order to notify the UE1 of configuration information (e.g., information of a discovery resource index that is allocated at step S106), the base station transmits an RRCD2DConfiguration message (S109).

When the base station receives a response message to the RRCD2DConfiguration message from the UE1 (S110), the base station inserts a success result into an open discovery configuration response message and transmits the open discovery configuration response message to the MME (S111).

Figure 5:
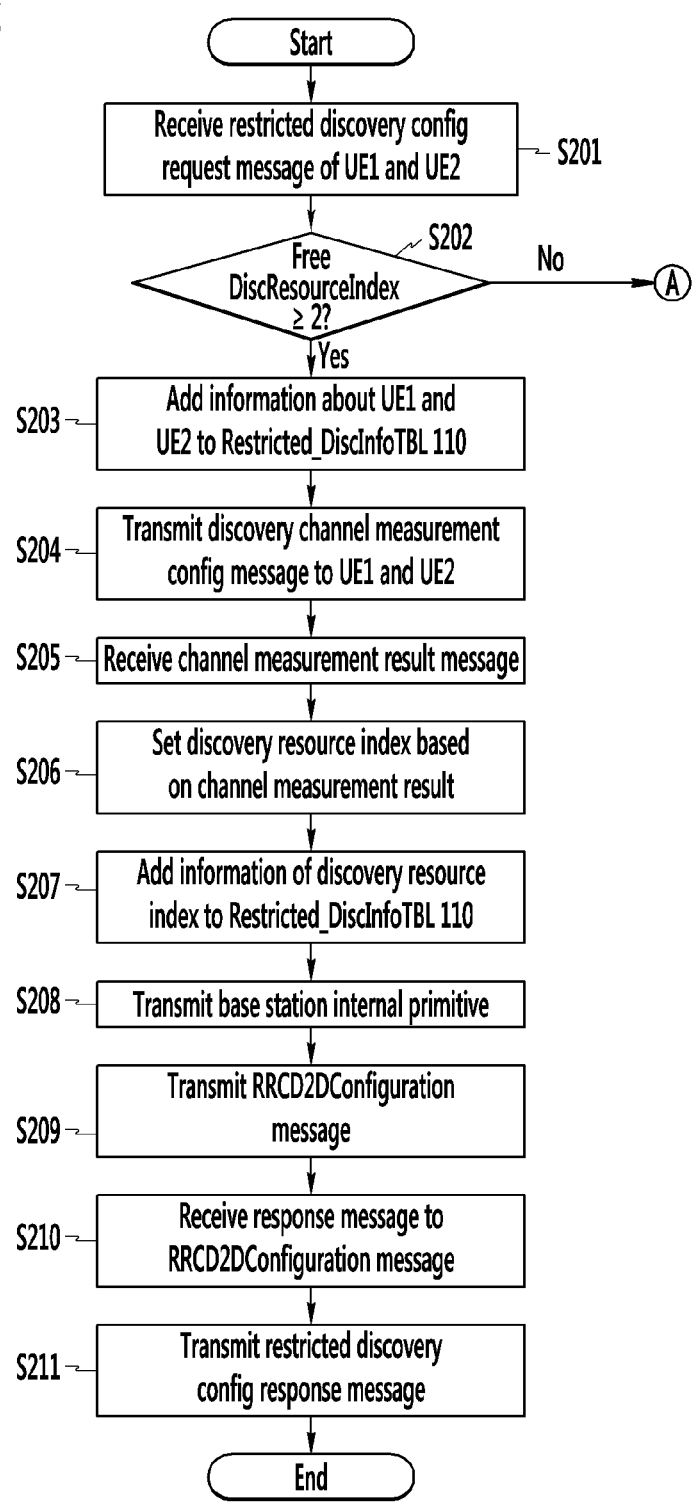
FIG. 5 is a flowchart illustrating a portion of a process in which a base station manages a second table when a restricted discovery service is set according to an exemplary embodiment of the present invention.

FIG. 5 is a flowchart illustrating a portion of a process in which a base station manages a Restricted_DiscInfoTBL 110 when a restricted discovery service is set according to an exemplary embodiment of the present invention.

The base station receives a request for a configuration of a restricted discovery service for the UE1 and the UE2 from the MME. Specifically, the base station may receive a restricted discovery config request message of the UE1 and the UE2 from the MME (S201). The base station, having received the restricted discovery config request message determines whether a discovery resource index is already allocated to both the UE1 and the UE2. If a discovery resource index is already allocated to both the UE1 and the UE2, the base station may add information (e.g., discovery number, local RNTI, peer RNTI, discovery resource index that is already allocated to the UE1, and discovery resource index that is already allocated to the UE2) related to the restricted discovery service for the UE1 and the UE2 to the Restricted_DiscInfoTBL 110. The base station may insert a success result into a restricted discovery configuration response message and transmit the restricted discovery configuration response message to the MME.

If a discovery resource index is not allocated to both the UE1 and the UE2, the base station determines whether an allocatable resource exists in discovery resources (S202). Specifically, the base station may determine an allocatable discovery resource index in discovery resources.

The base station determines whether the number of allocatable discovery resource indexes is equal to or greater than 2 (S202), and if the number of allocatable discovery resource indexes is equal to or greater than 2, the base station adds information about the UE1 and the UE2 to the Restricted_DiscInfoTBL 110 (S203). Specifically, the base station may add information (e.g., discovery number, local RNTI, and peer RNTI) related to a restricted discovery service for the UE1 and the UE2 to the Restricted_DiscInfoTBL 110. A process of a case (S202) in which the number of allocatable discovery resource indexes is smaller than two will be described in detail with reference to FIG. 6.

In order to measure a discovery channel, the base station transmits a discovery channel measurement configuration message to the UE1 and the UE2 (S204).

When the base station receives a channel measurement result message from the UE1 and the UE2 (S205), the base station sets (allocates) a discovery resource index to each of the UE1 and the UE2 based on the channel measurement result (S206).

The base station adds information of the discovery resource index that is set (allocated) at step S206 to the Restricted_DiscInfoTBL 110 (S207).

In order to notify a MAC layer of configuration information (e.g., information of a discovery resource index that is allocated at step S206), the base station transmits a base station internal primitive (S208).

In order to notify the UE1 and the UE2 of configuration information (e.g., information of a discovery resource index that is allocated at step S206), the base station transmits an RRCD2DConfiguration message (S209).

When the base station receives a response message to the RRCD2DConfiguration message from the UE1 and the UE2 (S210), the base station inserts a success result into a restricted discovery configuration response message and transmits the restricted discovery configuration response message to the MME (S211).

Figure 6:
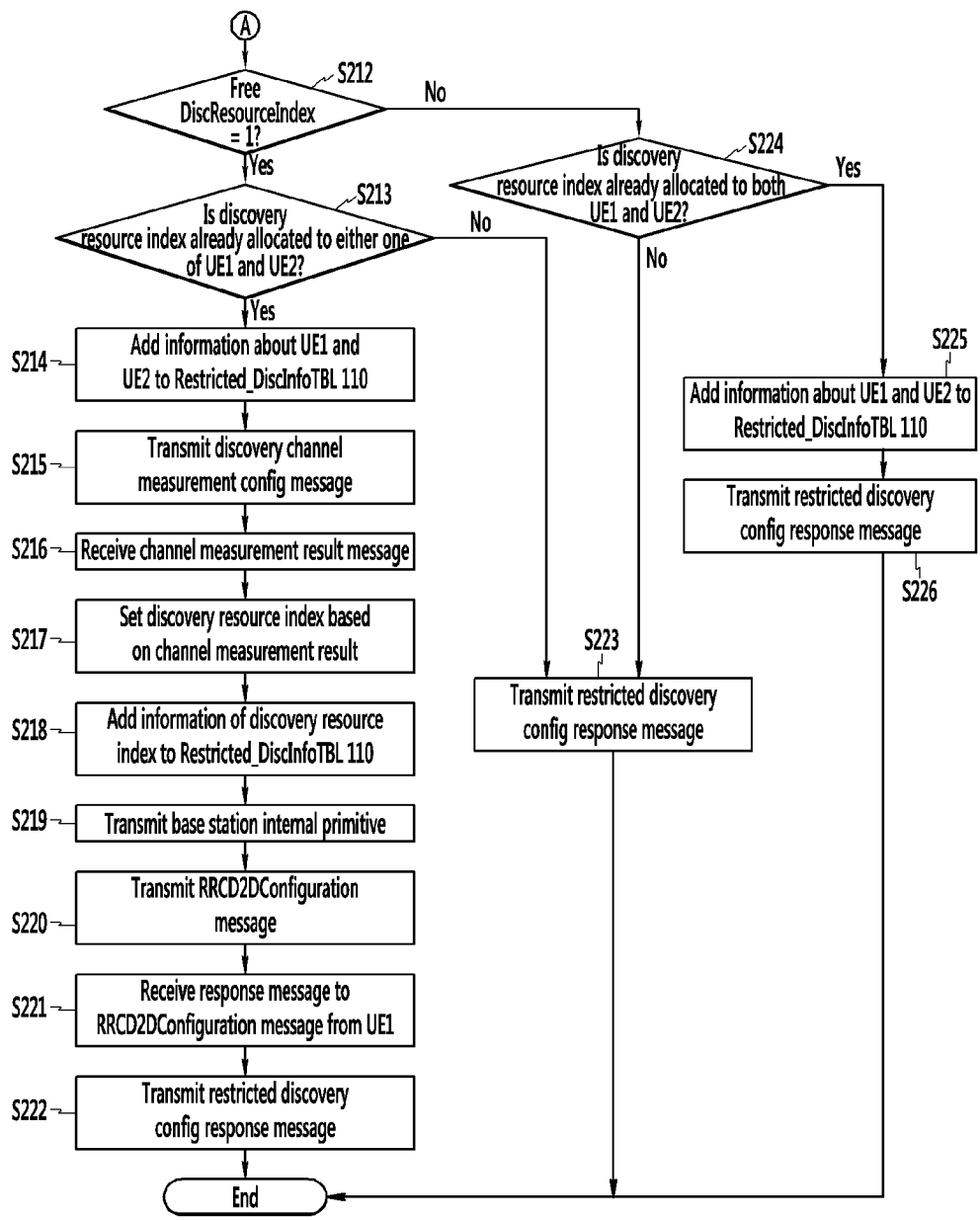
FIG. 6 is a flowchart illustrating another portion of a process in which a base station manages a second table when a restricted discovery service is set according to an exemplary embodiment of the present invention.

FIG. 6 is a flowchart illustrating another portion of a process in which a base station manages a Restricted_DiscInfoTBL 110 when a restricted discovery service is set according to an exemplary embodiment of the present invention. Specifically, FIG. 6 illustrates a process in which the number of allocatable resources is smaller than two among discovery resources.

The base station determines whether the number of allocatable discovery resource indexes is one (S212), and if the number of allocatable discovery resource indexes is one, the base station determines whether a discovery resource index is already allocated to either one of the UE1 and the UE2 (S213).

If a discovery resource index is already allocated to either one of the UE1 and the UE2, the base station adds information about the UE1 and the UE2 to the Restricted_DiscInfoTBL 110 (S214). For example, if a discovery resource index is already allocated to the UE2, the base station may add information (e.g., discovery number, local RNTI, and Peer RNTI) related to a restricted discovery service for the UE1 and the UE2 to the Restricted_DiscInfoTBL 110.

In order to measure a discovery channel, the base station transmits a discovery channel measurement configuration message to the UE1 (S215).

When the base station receives a channel measurement result message from the UE1 (S216), the base station sets (allocates) a discovery resource index to the UE1 based on the channel measurement result (S217).

The base station adds information of the discovery resource index that is set (allocated) at step S216 to the Open_DiscInfoTBL 100 (S218).

In order to notify a MAC layer of configuration information (e.g., information of a discovery resource index that is allocated at step S216), the base station transmits a base station internal primitive (S219).

In order to notify the UE1 of configuration information (e.g., information of a discovery resource index that is allocated at step S216), the base station transmits an RRCD2DConfiguration message (S220).

When the base station receives a response message to the RRCD2DConfiguration message from the UE1 (S221), the base station inserts a success result into a restricted discovery configuration response message and transmits the restricted discovery configuration response message to the MME (S222).

If the number of allocatable discovery resource indexes is one and a discovery resource index is not allocated to both the UE1 and the UE2 at step S213, the base station inserts a failure result representing that resource allocation is unavailable into a restricted discovery configuration response message and transmits the restricted discovery configuration response message to the MME (S223).

If the number of allocatable discovery resource indexes is one at step S212, the base station determines whether a discovery resource index is already allocated to both the UE1 and the UE2 (S224).

If a discovery resource index is already allocated to both the UE1 and the UE2, the base station adds information about the UE1 and the UE2 to the Restricted_DiscInfoTBL 110 (S225). Specifically, the base station may add information (e.g., discovery number, local RNTI, peer RNTI, and discovery resource index) related to a restricted discovery service for the UE1 and the UE2 to the Restricted_DiscInfoTBL 110.

The base station inserts a success result into a restricted discovery configuration response message and transmits the restricted discovery configuration response message to the MME (S226).

If the number of allocatable discovery resource indexes is one and a discovery resource index is not allocated to both the UE1 and the UE2 at step S224, the base station inserts a failure result representing that resource allocation is unavailable into a restricted discovery configuration response message and transmits the restricted discovery configuration response message to the MME (S223).

Figure 7:
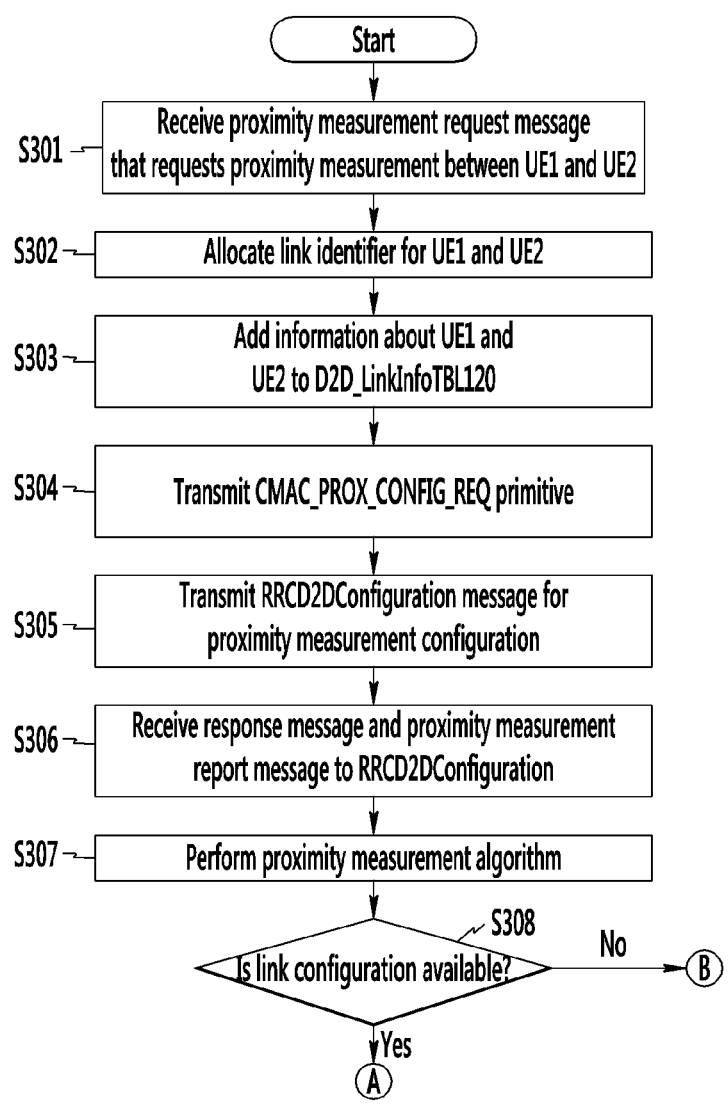
FIG. 7 is a flowchart illustrating a portion of a process in which a base station manages a third table when a D2D communication service is set according to an exemplary embodiment of the present invention.

FIG. 7 is a flowchart illustrating a portion of a process in which a base station manages a D2D_LinkInfoTBL 120 when a D2D communication service is set according to an exemplary embodiment of the present invention. Specifically, FIG. 7 illustrates a process in which the base station manages the D2D_LinkInfoTBL 120 when proximity measurement and a bearer configuration are performed for a D2D communication service.

The base station receives a request for a configuration of a D2D communication service for the UE1 and the UE2 from the MME. Specifically, the base station may receive a proximity measurement request message that requests proximity measurement between the UE1 and the UE2 from the MME (S301).

The base station allocates a link identifier for the UE1 and the UE2 (S302).

The base station adds information about the UE1 and the UE2 to the D2D_LinkInfoTBL 120 (S303). Specifically, the base station adds information (e.g., link identifier, local RNTI, and peer RNTI) related to a D2D communication service for the UE1 and the UE2 to the D2D_LinkInfoTBL 120.

In order to notify a MAC layer of configuration information (e.g., link identifier, channel information for proximity measurement), the base station transmits a CMAC_PROX_CONFIG_REQ primitive (S304).

In order to notify the UE1 and the UE2 of configuration information (e.g., link identifier, channel information for proximity measurement), the base station transmits an RRCD2DConfiguration message for a proximity measurement configuration (S305).

When the base station receives a proximity measurement report message and a response message (RRCD2DConfiguration completion message) to an RRCD2DConfiguration from the UE1 and the UE2 (S306), the base station performs a proximity measurement algorithm (S307) and determines whether a link configuration is available between the UE1 and the UE2 using proximity measurement algorithm (S308). A process in which a link configuration is available and a process in which a link configuration is unavailable will be described in detail with reference to FIG. 8.

Figure 8:
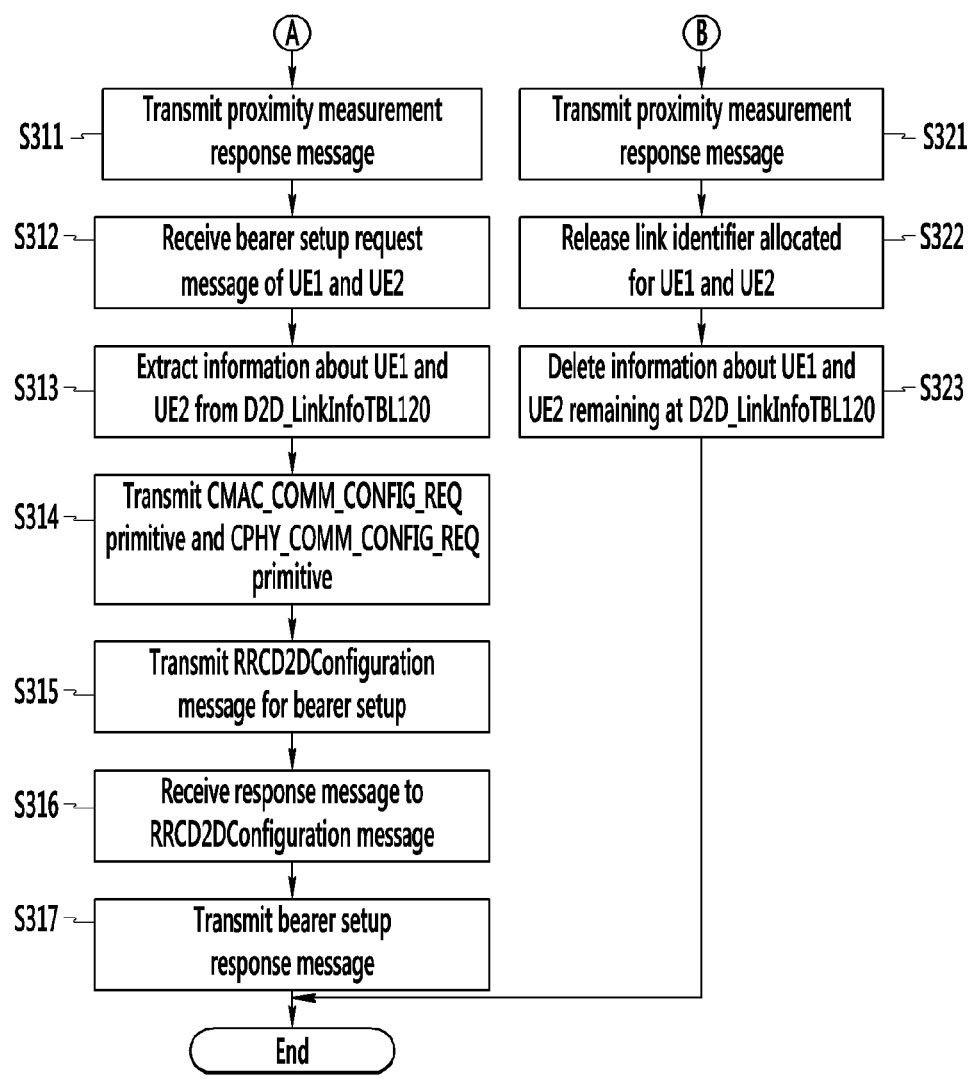
FIG. 8 is a flowchart illustrating another portion of a process in which a base station manages a third table when a D2D communication service is set according to an exemplary embodiment of the present invention.

FIG. 8 is a flowchart illustrating another portion of a process in which a base station manages a D2D_LinkInfoTBL when a D2D communication service is set according to an exemplary embodiment of the present invention.

If a link configuration is available between the UE1 and the UE2 using the proximity measurement algorithm at step S308, i.e., if a link state is in a link acceptable state, the base station inserts a link acceptable result representing that communication is available into a proximity measurement response message and transmits the proximity measurement response message to the MME (S311).

The MME, having received the link acceptable result, transmits a bearer setup request message to the base station for a communication configuration.

When the base station receives a bearer setup request message of the UE1 and the UE2 from the MME (S312), the base station extracts information (e.g., link identifier, local RNTI, and peer RNTI) about the UE1 and the UE2 from the D2D_LinkInfoTBL 120 (S313).

In order to notify a MAC layer and a Physical (PHY) layer of the base station of configuration information (e.g., link identifier, and channel (bearer) information for data transmission) including information that is extracted at step S313, the base station transmits each of a CMAC_COMM_CONFIG_REQ primitive and a CPHY_COMM_CONFIG_REQ primitive (S314).

In order to notify the UE1 and the UE2 of configuration information (e.g., link identifier, channel (bearer) information for data transmission), the base station transmits an RRCD2DConfiguration message for bearer setup (S315).

When the base station receives a response message (RRCD2DConfiguration completion message) to the RRCD2DConfiguration message from the UE1 and the UE2 (S316), the base station inserts a success result into a bearer setup response message and transmits the bearer setup response message to the MME (S317).

If a link configuration is unavailable between the UE1 and the UE2 using the proximity measurement algorithm at step S308, i.e., if a link state is in a link unacceptable state, the base station inserts a link unacceptable result representing that communication is unavailable into a proximity measurement response message and transmits the proximity measurement response message to the MME (S321).

The base station releases a link identifier that is allocated for the UE1 and the UE2 (S322).

The base station deletes information about the UE1 and the UE2 remaining at the D2D_LinkInfoTBL 120 (S323). Specifically, the base station may delete information (e.g., link identifier, local RNTI, and peer RNTI) related to a D2D communication service for the UE1 and the UE2 from the D2D_LinkInfoTBL 120.

Figure 9:
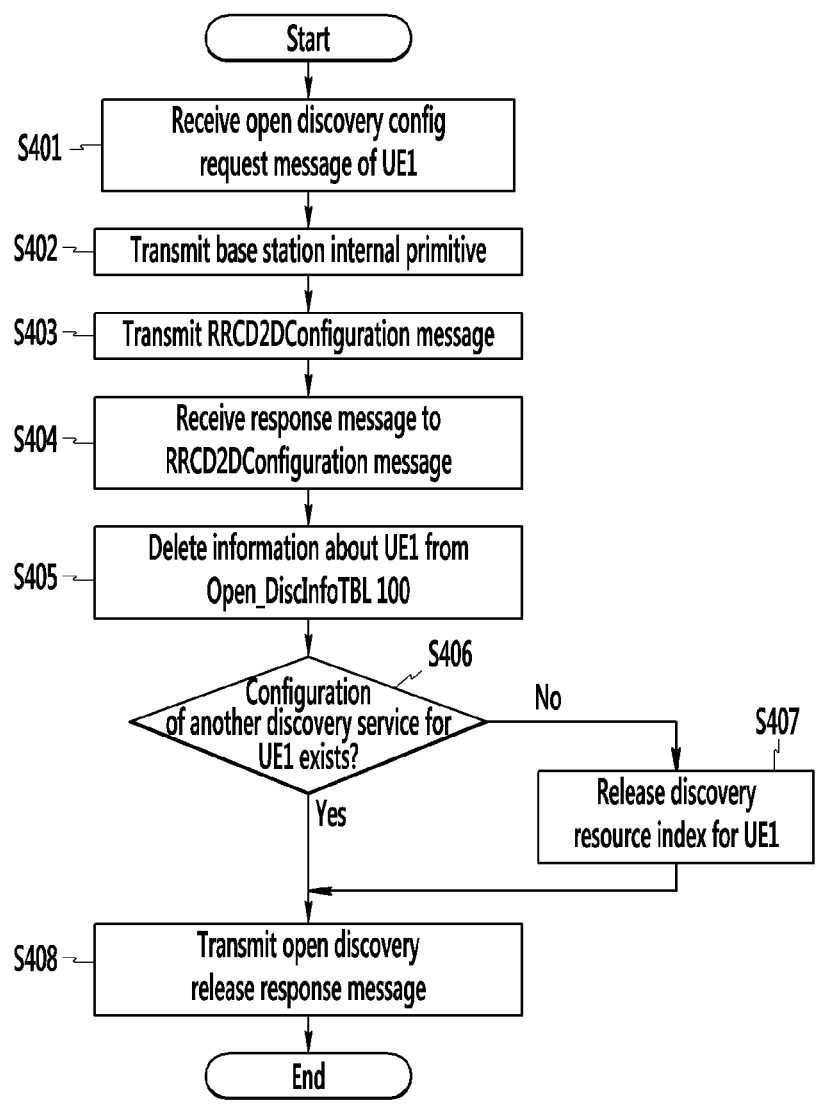
FIG. 9 is a flowchart illustrating a process in which a base station manages a first table when an open discovery service is released according to an exemplary embodiment of the present invention.

FIG. 9 is a flowchart illustrating a process in which a base station manages an Open_DiscInfoTBL 100 when an open discovery service is released according to an exemplary embodiment of the present invention.

The base station receives a request for release of an open discovery service for a UE1 from an MME. Specifically, the base station may receive an open discovery release request message of the UE1 from the MME (S401).

In order to notify a MAC layer of release information of an open discovery service, the base station transmits a base station internal primitive (S402).

In order to notify the UE1 of release information of an open discovery service, the base station transmits an RRCD2DConfiguration message (S403).

When the base station receives a response message to an RRCD2DConfiguration message from the UE1 (S404), the base station deletes information (e.g., discovery number, local RNTI, discovery resource index) related to a corresponding open discovery service (open discovery service that receives a release request) for the UE1 from the Open_DiscInfoTBL 100 (S405). Specifically, the base station may search for an open discovery service to release using a discovery number that is included in the open discovery release request message. The base station may delete information related to the found open discovery service from the Open_DiscInfoTBL 100.

The base station determines whether a configuration of another discovery service for the UE1 exists (S406). Specifically, the base station may determine whether another discovery service for the UE1 other than a discovery service that receives a release request exists.

If a configuration of another discovery service for the UE1 does not exist at step S406, the base station releases a discovery resource index for the UE1 (S407). If a configuration of another discovery service for the UE1 exists at step S406, the base station does not release a discovery resource index for the UE1.

The base station inserts a success result into an open discovery release response message and transmits the open discovery release response message to the MME (S408).

Figure 10:
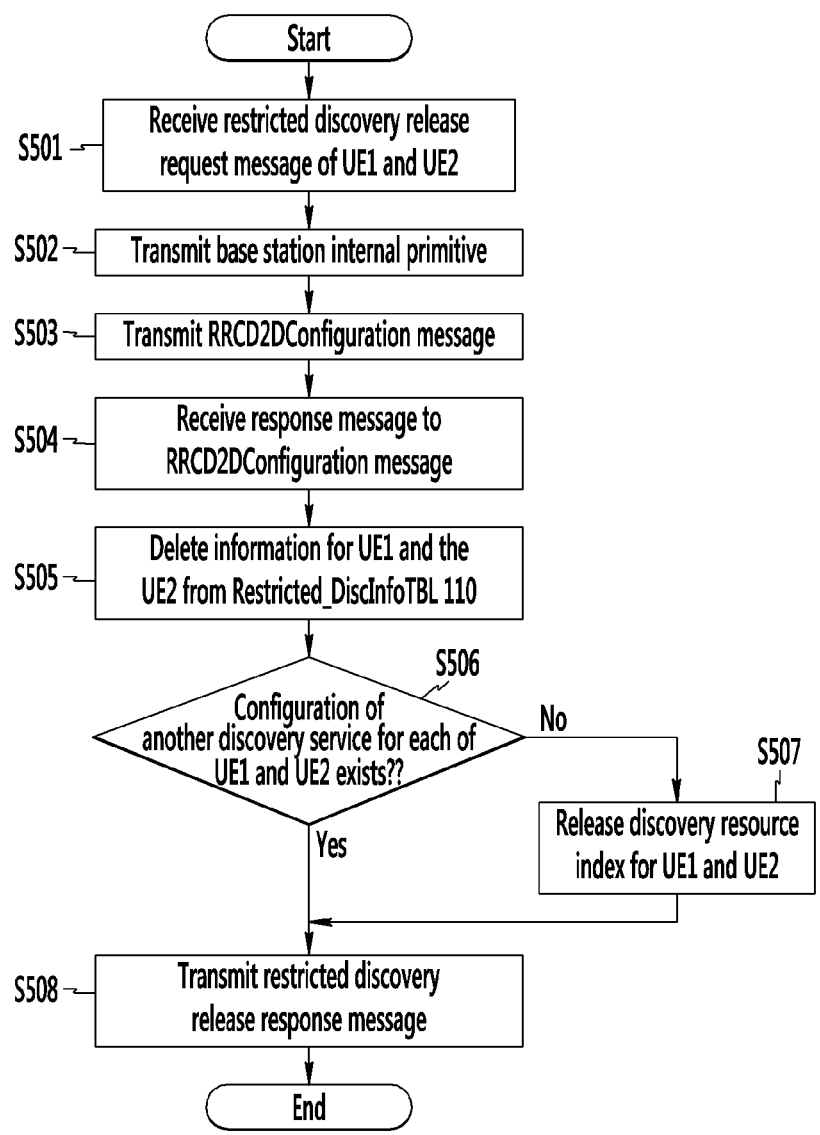
FIG. 10 is a flowchart illustrating a process in which a base station manages a second table when a restricted discovery service is released according to an exemplary embodiment of the present invention.

FIG. 10 is a flowchart illustrating a process in which a base station manages a Restricted_DiscInfoTBL 110 when a restricted discovery service is released according to an exemplary embodiment of the present invention.

The base station receives a request for release of a restricted discovery service for the UE1 and the UE2 from the MME. Specifically, the base station may receive a restricted discovery release request message of the UE1 and the UE2 from the MME (S501).

In order to notify a MAC layer of release information of a restricted discovery service, the base station transmits a base station internal primitive (S502).

In order to notify the UE1 and the UE2 of release information of a restricted discovery service, the base station transmits an RRCD2DConfiguration message (S503).

When the base station receives a response message to an RRCD2DConfiguration message from the UE1 and the UE2 (S504), the base station deletes information (e.g., discovery number, local RNTI, peer RNTI, and discovery resource index) related to a corresponding restricted discovery service (restricted discovery service that receives a release request) for the UE1 and the UE2 from the Restricted_DiscInfoTBL 110 (S505). Specifically, the base station may search for a restricted discovery service to release using a discovery number that is included in the restricted discovery release request message. The base station may delete information related to the found restricted discovery service from the Restricted_DiscInfoTBL 110.

The base station determines whether a configuration of another discovery service for each of the UE1 and the UE2 exists (S506). Specifically, the base station may determine whether another discovery service for each of the UE1 and the UE2 exists other than a discovery service that receives the release request.

If a configuration of another discovery service for the UE1 and the UE2 does not exist at step S506, the base station releases a discovery resource index for the UE1 and the UE2 (S507). If a configuration of another discovery service for each of the UE1 and the UE2 exists at step S506, the base station does not release a discovery resource index for the UE1 and the UE2.

The base station inserts a success result into a restricted discovery release response message and transmits the restricted discovery release response message to the MME (S508).

Figure 11:
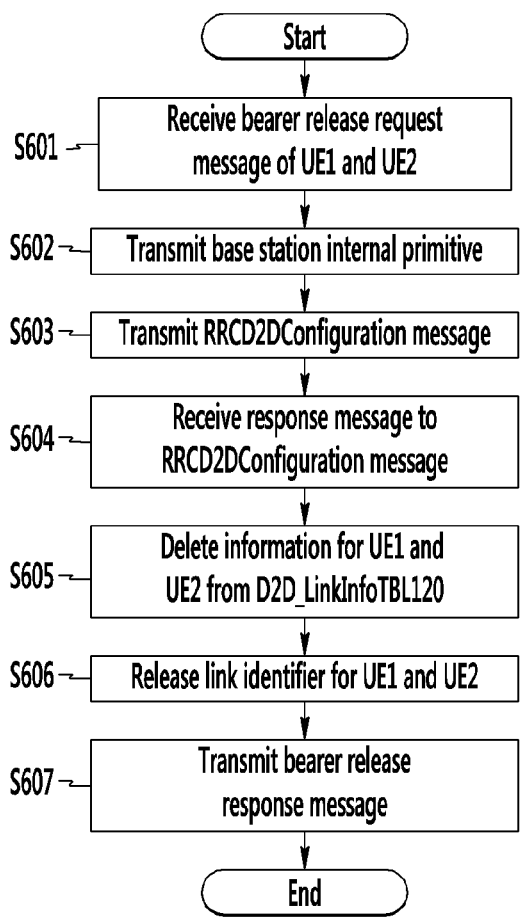
FIG. 11 is a flowchart illustrating a process in which a base station manages a third table when a D2D communication service is released according to an exemplary embodiment of the present invention.

FIG. 11 is a flowchart illustrating a process in which a base station manages a D2D_LinkInfoTBL 120 when a D2D communication service is released according to an exemplary embodiment of the present invention. Specifically, FIG. 7 illustrates a process in which the base station manages the D2D_LinkInfoTBL 120 when release of a bearer for a D2D communication service is performed.

The base station receives a request for release of a D2D communication service for the UE1 and the UE2 from the MME. Specifically, the base station may receive a bearer release request message of the UE1 and the UE2 from the MME (S601).

In order to notify a MAC layer of release information (i.e., release information of a communication link) of a D2D communication service, the base station transmits a base station internal primitive (S602).

In order to notify the UE1 and the UE2 of release information of a D2D communication service, the base station transmits an RRCD2DConfiguration message (S603).

When the base station receives a response message to the RRCD2DConfiguration message from the UE1 and the UE2 (S604), the base station deletes information (e.g., link identifier, local RNTI, peer RNTI, measurement identifier, and measurement type) related to a corresponding D2D communication service (D2D communication service that receives a release request) for the UE1 and the UE2 from the D2D_LinkInfoTBL 120 (S605).

The base station releases a link identifier for the UE1 and the UE2 (S606).

The base station inserts a success result into a bearer release response message and transmits the bearer release response message to the MME (S607).

Figure 12:
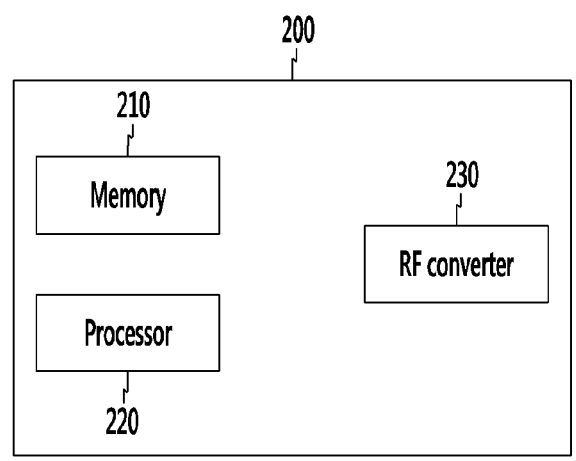
FIG. 12 is a block diagram illustrating a configuration of a base station according to an exemplary embodiment of the present invention.

FIG. 12 is a block diagram illustrating a configuration of a base station 200 according to an exemplary embodiment of the present invention.

The base station 200 includes a memory 210, a processor 220, and a Radio Frequency (RF) converter 230.

The processor 220 may implement a procedure, method, and function that are described with reference to FIGS. 1 to 11.

The memory 210 is connected to the processor 220 and stores various information related to operation of the processor 220.

The RF converter 230 is connected to the processor 220 and transmits or receives a wireless signal. The base station 200 may have a single antenna or multiple antennas.

According to an exemplary embodiment of the present invention, D2D related information within a base station system necessary for direct communication between terminals can be efficiently managed. Specifically, according to an exemplary embodiment of the present invention, a base station can internally manage information about a D2D terminal, discovery ID, information for proximity measurement and management, and link information between D2D terminals necessary for direct communication between terminals. Thereby, a base station according to an exemplary embodiment of the present invention can efficiently perform configuration and release of a discovery service or a D2D communication service.

Further, according to an exemplary embodiment of the present invention, a high quality D2D service can be provided.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method in which a base station manages information for Device to Device (D2D) communication, which is direct communication between terminals, the method comprising:
   receiving a first message that requests a configuration of a first open discovery service that searches for at least one terminal to perform D2D communication with a first terminal;
   determining whether a resource to allocate to the first terminal exists; and
   storing, in an open discovery information table including a field of a discovery number, a field of a radio network temporary identifier (RNTI) and a field of a discovery resource index, first information for providing the first open discovery service based on the determination result,
   wherein the determining of whether a resource to allocate to the first terminal exists comprises determining, when a resource is not allocated to the first terminal, whether a resource to allocate to the first terminal exists by determining an allocatable discovery resource index, and
   wherein if a number of allocatable discovery resource indexes is equal to or greater than 1, information about the first terminal is added to the open discovery information table.

2. The method of claim 1, further comprising:
   transmitting a second message that requests measurement of a channel for the first open discovery service to the first terminal;
   allocating at least one first resource to the first terminal based on a channel measurement result that is received from the first terminal; and
   including information of the first resource in the first information.

3. The method of claim 2, wherein the receiving of a first message comprises receiving the first message from a Mobility Management Entity (MME),
   wherein the first information comprises:
   a discovery number that is included in the first message;
   Radio Network Temporary Identifier (RNTI) information that is allocated to the first terminal; and
   information of the first resource.

4. The method of claim 1, wherein the determining of whether a resource to allocate to the first terminal exists comprises determining whether a resource is already allocated to the first terminal, and
   the storing of first information comprises including, when a resource is already allocated to the first terminal, information of the already allocated resource in the first information and storing the first information.

5. The method of claim 3, further comprising:
transmitting a primitive comprising information of the first resource to a Media Access Control (MAC) layer; and
transmitting a third message comprising information of the first resource to the first terminal.

6. The method of claim 3, further comprising:
receiving a third message that requests release of the first open discovery service from the MME;
transmitting a fourth message comprising information for release of the first open discovery service to the first terminal; and
deleting the first information, when a response message to the fourth message is received from the first terminal.

7. The method of claim 6, further comprising:
determining whether another open discovery service for the first terminal other than the first open discovery service exists; and
releasing the first resource based on whether another open discovery service for the first terminal exists.

8. A method in which a base station manages information for Device to Device (D2D) communication, which is direct communication between terminals, the method comprising:
receiving a first message that requests a configuration of a first restricted discovery service that searches for a second terminal to perform D2D communication with a first terminal from a Mobility Management Entity (MME);
determining whether a resource to allocate to the first terminal and the second terminal exists;
storing, in an restricted discovery information table including a field of a discovery number, fields of radio network temporary identifiers (RNTIs) and a field of a discovery resource index, first information for providing the first restricted discovery service based on the determination result;
transmitting a second message that requests measurement of a channel for the first restricted discovery service to at least one of the first terminal and the second terminal based on the determination result;
allocating at least one resource to at least one of the first terminal and the second terminal based on a channel measurement result that is received from at least one of the first terminal and the second terminal: and
including information of the allocated resource in the first information,
wherein the storing of first information comprises storing the first information, when the determination result corresponds to one of a first case in which a number of allocatable discovery resource indexes is at least two, a second case in which the number of allocatable discovery resource indexes is one and in which a resource is already allocated to one of the first terminal and the second terminal, and a third case in which a resource is already allocated to both the first terminal and the second terminal.

9. The method of claim 8, wherein the first information comprises:
a discovery number that is included in the first message;
RNTI information that is allocated to the first terminal;
RNTI information that is allocated to the second terminal; and
information of the allocated resource.

10. The method of claim 8, wherein the transmitting of a second message comprises:

transmitting, when the determination result corresponds to the first case, the second message to the first terminal and the second terminal; and
transmitting, when the determination result corresponds to the second case, the second message to the first terminal to which a resource is not allocated among the first terminal and the second terminal.

11. The method of claim 10, wherein the allocating of at least one resource comprises:
allocating, when the determination result corresponds to the first case, at least one resource to each of the first terminal and the second terminal based on a channel measurement result that is received from the first terminal and the second terminal; and
allocating, when the determination result corresponds to the second case, at least one resource to the first terminal based on a channel measurement result that is received from the first terminal.

12. The method of claim 11, further comprising:
transmitting a primitive comprising information of the allocated resource to a MAC layer; and
transmitting information of the allocated resource to at least one of the first terminal and the second terminal.

13. The method of claim 8, further comprising:
receiving a third message that requests release of the first restricted discovery service from the MME;
transmitting a primitive comprising information for release of the first restricted discovery service to a MAC layer;
transmitting a fourth message comprising information for release of the first restricted discovery service to the first terminal and the second terminal; and
deleting the first information from the restricted discovery information table, when a response message to the fourth message is received from the first terminal and the second terminal.

14. A method in which a base station manages information for Device to Device (D2D) communication, which is direct communication between terminals, the method comprising:
receiving a first message that requests first proximity measurement between a first terminal and a second terminal from a Mobility Management Entity (MME) for a first D2D communication service for data communication between the first terminal and the second terminal;
allocating the same first link identifier to the first terminal and the second terminal;
storing, in a first table including a field of a link identifier, fields of radio network temporary identifiers (RNTIs), a field of a measurement identifier and a field of a measurement type, information of the first terminal, information of the second terminal, and the first link identifier;
transmitting a second message that requests the first proximity measurement to the first terminal and the second terminal; and
wherein the storing of information comprises:
storing the first link identifier in the field of a link identifier;
storing RNTI information allocated to the first terminal and RNTI information allocated to the second terminal in the fields of RNTIs;
storing an identifier of the first proximity measurement in the field of a measurement identifier; and
storing a type of the first proximity measurement in the field of a measurement type.

15. The method of claim 14, further comprising:

determining whether a link configuration between the first terminal and the second terminal is available based on a proximity measurement result that is received from the first terminal and the second terminal;

transmitting a third message comprising the determination result to the MME;

receiving a fourth message that requests a configuration of a bearer from the MME, having received the third message;

transmitting information of the first terminal, information of the second terminal, the first link identifier, and information about the bearer to a MAC layer and a Physical (PHY) layer; and transmitting the information about the bearer to the first terminal and the second terminal.

16. The method of claim 15, wherein the transmitting of a third message comprises:

transmitting, when a link configuration between the first terminal and the second terminal is available, the third message representing that a link configuration is available to the MME; and transmitting, when a link configuration between the first terminal and the second terminal is unavailable, the third message representing that a link configuration is unavailable to the MME, releasing the first link identifier, and deleting information of the first terminal, information of the second terminal, and the first link identifier from the first table.

17. The method of claim 14, further comprising:

receiving a fifth message that requests release of the first D2D communication service from the MME;

transmitting a sixth message comprising information for release of the first D2D communication service to the first terminal and the second terminal;

deleting, when a response message to the sixth message is received from the first terminal and the second terminal, information related to the first D2D communication service from the first table; and releasing the first link identifier.

* * * * *